Oct. 10, 1961 J. H. O. HARRIES 3,004,099

APPARATUS FOR LIGHT INTENSITY CONTROL IN COLOR TELEVISION PROJECTION APPARATUS

Filed Aug. 27, 1958 2 Sheets-Sheet 1

Inventor
John Henry Owen Harries
By
Ralph B. Stewart
Attorney

Oct. 10, 1961 J. H. O. HARRIES 3,004,099

APPARATUS FOR LIGHT INTENSITY CONTROL IN COLOR TELEVISION PROJECTION APPARATUS

Filed Aug. 27, 1958 2 Sheets-Sheet 2

Inventor
John Henry Owen Harries
By Ralph B. Stewart
Attorney

United States Patent Office 3,004,099

Patented Oct. 10, 1961

3,004,099

APPARATUS FOR LIGHT INTENSITY CONTROL IN COLOR TELEVISION PROJECTION APPARATUS

John H. O. Harries, Warwick, Bermuda, assignor to Harries Television Research Limited Filed Aug. 27, 1958, Ser. No. 757,520
Claims priority, application Great Britain Sept. 2, 1957
15 Claims. (Cl. 178—5.4)

This invention relates to television receivers of the kind which employ an optical projection system between the fluorescent screen and a viewing screen, for example color television receivers of this kind.

In colour television reception systems of the kind in which component images, each of one primary colour (red, blue and green), are reproduced respectively by exciting phosphor screens in separate electron discharge tubes, and wherein optical systems are used to project the light from each of the phosphor screens to a viewing screen where the primary colour images combine to form a colour or monochrome picture, a difficulty arises due to the unequal efficiencies of light production by the three phosphors and to the fact that unequal amounts of light are required from the three phosphors in order to obtain balanced colour reproduction and a satisfactory white in the colour picture. The same difficulty arises in reproducing a monochrome picture in a colour television reception system by combining component colour pictures when that system is of the compatible type. An attempt is sometimes made to compensate for these unequal efficiencies and unequal light requirements by correspondingly adjusting the relative magnitudes of the instantaneous power supplied to the phosphors by adjusting the electron beam currents in the respective electron discharge tubes, or cathode ray tubes. This can be done by driving the control or modulator electrodes of the respective cathode ray tubes unequally, or by using equal drives to the modulator electrodes, but providing unequal blackout potentials in each cathode ray tube by suitably setting the potential upon the first anode of each of the cathode ray tubes. A disadvantage of these expedients is that they do not result in the same transfer characteristic, or gamma, for each of the three component colour images. The result is an inferior colour picture during colour television reception and an objectionable tinting and lack of a proper grey scale during reception of a monochrome picture by a compatible television reception system. Another difficulty is that, in these circumstances, there is, in practice, a tendency for the beam currents for given drives to the three tubes to vary relatively to each other due to unavoidable variations of supply voltages and temperatures when the television receiver is in use, so that the colour balance of the received picture varies and becomes unsatisfactory.

The present invention provides apparatus for controlling light-intensity in television receivers of the kind employing an optical projection system and solves the problem of colour balance in colour and compatible television receivers of this kind in a manner which obviates or at least reduces the above-mentioned disadvantages.

According to the present invention, a television receiver which comprises an electron discharge tube, which has a fluorescent screen and means for controlling an electron beam to form a raster thereon, and an optical projection system which forms an image of the raster on a viewing screen, includes in the optical projection system an aperture plate having a plurality of apertures distributed over its surface for the passage of the light. The total area of the apertures in the plate is selected in accordance with the desired value of the numerical aperture of the projection system. The advantage of such an arrangement is that it regulates the amount of light passing to the viewing screen while preserving a substantially uniform illumination of the viewing screen. Owing to the very large numerical aperture which it is necessary to employ in optical projection systems in television receivers because of the relatively low light efficiency of the colour phosphors, the use of a single adjustable aperture to regulate the light would result in non-uniform illumination. In colour television receivers (which include colour radar receivers) employing at least two electron discharge tubes having fluorescent screens which fluoresce in different colours and optical projection systems by which images of the rasters are superimposed on the viewing screen, the colour balance of the image of the viewing screen can be modified by including in at least one of the optical projection systems an aperture plate having a plurality of apertures distributed over its surface, the total aperture area being selected to provide the required colour balance. Thus, in a colour television receiver employing electron discharge tubes fluorescing in red, green and blue respectively, the operating conditions of the tubes and the total aperture areas of the aperture plates associated with the tubes of each colour or the tubes of all but one of the colours can be used to produce on the viewing screen the desired white balance when a transmitted signal representing white is received. It is preferable to arrange for the drive potentials which are applied to the control or modulator electrodes of the tubes to be substantially equal when the colour reproduced on the viewing screen is substantially white, and to apply substantially equal blackout potentials to the tubes. If this is done, each of the component colour images will have substantially the same transfer characteristic with the result that a better picture quality will be obtained.

If desired, provision may be made for easy adjustment of the colour balance either by interchanging aperture plates of different total aperture areas, or by varying the total area of the apertures in a given plate through a continuous range. In one embodiment the aperture plate comprises two multiple-aperture layers mounted one behind the other and arranged for relative rotation to enable a variation of the total aperture area to be obtained in order to enable adjustment of the colour balance.

Although the multiple-aperture plates described above would not be considered for the usual optical systems because of the deterioration of picture quality which they would cause, I have found that the sizes and arrangements of the individual apertures in the aperture plates may be varied over a very wide range to control the amount of light travelling to the viewing screen in the special case of television systems having practicable standards of definition. Deterioration of the definition would be produced, partly due to diffraction effects, if the individual apertures were made very small and such deterioration would be made worse if the arrangement of the apertures were not then made random.

The aperture plates described above also provide a cheaper and more flexible form of light control than would be provided by neutral density filters.

In order that the invention may be better understood several embodiments thereof will now be described with reference to the accompanying drawings, in which.

Before the drawings are described in detail, some data will be given to illustrate the nature of a typical problem which is solved by the present invention, namely the problem of achieving a correct white balance in colour television receivers. According to Bril and Klasens (Philips Res. Rep., volume 10, pages 305–318), the efficiencies of typical blue, green and red phosphors are as follows:

| Colour | Composition | Efficiency |
|---|---|---|
| Blue | ZnS-AgII | 10 lumens/watt. |
| Green | $Zn_2SiO_4$-Mn | 42 lumens/watt. |
| Red | $Zn_3(PO_4)_2$-Mn | 7.5 lumens/watt. |

The spectral characteristics of these phosphors are such that to give illuminant "C" white, the relative percentage lumen contributions of the blue, green and red phosphors must be 7%, 62% and 31% respectively. As a consequence when the instantaneous excitation conditions for the phosphors are equal, the required transmission of light for blue, green and red optical systems (for the phosphors given and for illuminant "C" white) must be in the ratio 7/10:62/42:31/7.5, that is to say .7:1.47:4.13. Dividing these figures by 4.13 so that the transmission value for red is equal to 1.0, the ratio becomes .17:.357:1.0. Thus the optical projection system associated with the red image must be given the largest optical aperture, that of the blue the smallest optical aperture, and that of the green an intermediate optical aperture.

Figure 1:
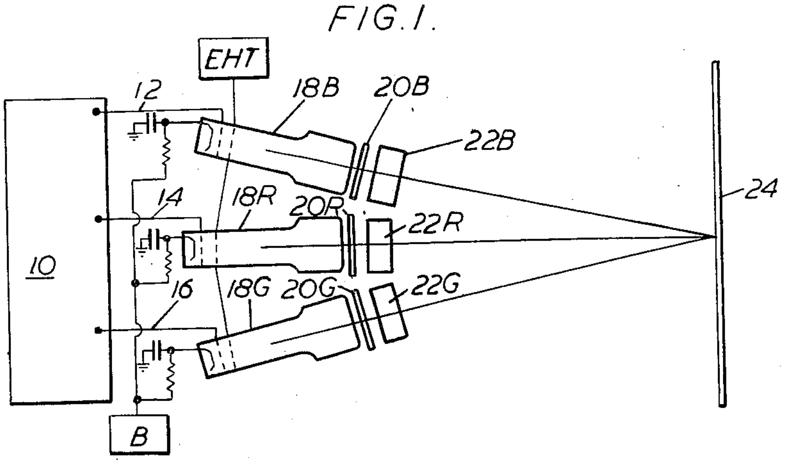
FIGURE 1 shows diagrammatically a colour television reception system of the kind employing three separate cathode ray tubes.

FIGURE 1 illustrates diagrammatically a colour television receiver of the kind employing three cathode ray tubes, each with its own optical projection system. In FIGURE 1, which is not to scale, the block 10 represents circuits capable of supplying modulating signals by way of conductors 12, 14, 16 to cathode ray tubes 18B, 18R and 18G, which have fluorescent screens which fluoresce in blue, red and green respectively but are otherwise substantially identical.

The light rays from the blue, red and green images on the fluorescent screens of these cathode ray tubes pass through aperture plates 20B, 20R and 20G respectively and through optical projection systems 22B, 22R and 22G, and the projected images are superimposed on a common viewing screen 24. The electrode potentials on the three substantially identical cathode ray tubes 18B, 18R and 18G, are arranged to be equal; thus the anode and accelerator potentials are supplied from the common source of potential EHT, and the cathodes and the three cathode ray tubes are individually biassed to substantially the same potential by means of the decoupling condensers and resistances from a source of bias B. The modulating signals are arranged to be equal in amplitude when a white signal is received. The aperture plates 20B, 20R and 20G are chosen to provide relative transmissions of light in the ratios specified above. It will be recognised that in these circumstances the gammas of the three cathode ray tubes will tend to be the same and good colour and monochrome reproduction will be obtained.

Figure 2:
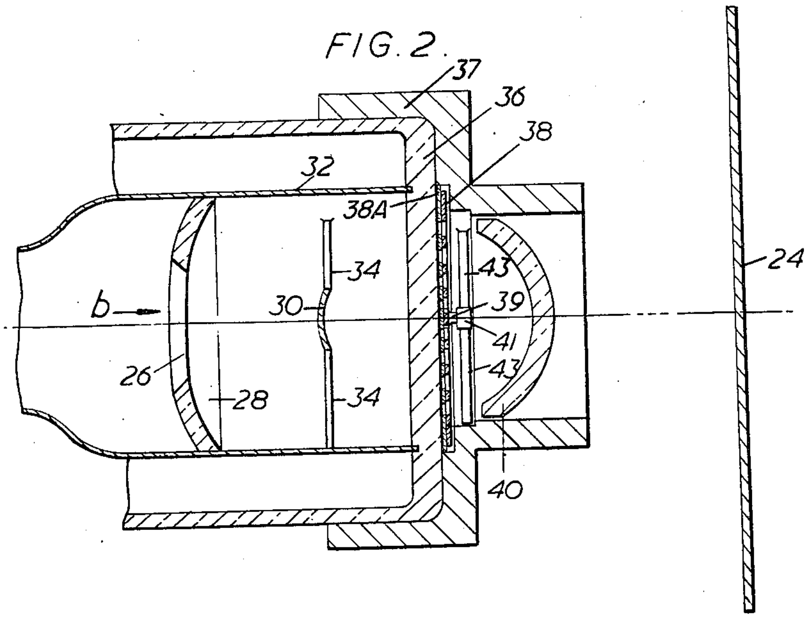
FIGURE 2 is an enlarged view of the optical projection system associated with each of the cathode ray tubes of FIGURE 1.

FIGURE 2 shows part of a cathode ray tube and its associated projection system in greater detail. In this figure a mirror optical projection system employing a deep meniscus lens as a correcting element is shown, the electron beam passing in the direction of the arrow *b* through an aperture 26 centrally disposed in a concave mirror 28 before reaching a circular convex phosphor screen 30 which is supported from the walls of an inner casing 32 by straps 34. Light rays from the phosphor 30 are reflected by the concave mirror 28 back past the phosphor

30, the straps 34 being made as thin as possible in order to minimise obstruction to the light rays. These rays then pass through the thick plate glass front of the outer casing 36, through aperture plates 38A and 38, respectively, and a meniscus 40, before reaching the common viewing screen 24. The total area of the resulting apertures in the superimposed plates 38 and 38A determines the numerical aperture of the projection system. The aperture plates 38 and 38A are held within a casing 37 fixed on the front of the glass casing 36. In the example shown in the drawings the plate 38 is mounted on a shaft 39 which rotates in a journal 41 connected to the outer portion of the casing 37 through the arms 43 of a spider support. The plate 38A is fixed. The advantage of this method of mounting the plate when adjustment of the numerical aperture through a continuous range is required will be seen later. However, adjustment of the numerical aperture can also be effected by interchanging the aperture plates, for example by sliding different plates through a slot in the casing 37. The arms 43 are so arranged as to obstruct the light rays as little as possible in their passage from the mirror 28 to the screen 24. The journal 41 does not seriously interfere with the light rays since it is in the shadow of the phosphor screen 30.

Figure 3:
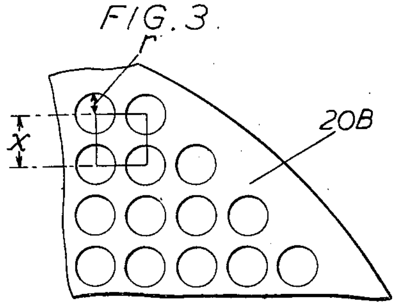
FIGURES 3 and 4 show sections of alternative forms of aperture plates for use in the optical projection systems of the colour television receiver.

A wide angle optical system such as that of FIGURE 2 is found to suffer from vignetting if a single adjustable aperture in the aperture plate is reduced in diameter to control the amount of light projected to the screen. This would result in a non-uniform illumination over the area of the projected picture. Therefore the aperture plate is provided with a large number of apertures. A plate of this kind is shown diagrammatically in FIGURE 3, the apertures being arranged so that their centres form a pattern of squares. If the side of each square is given by $x$ and the radius of the aperture is $r$, the transmission $t$ of the plate can be obtained from the equation:

$$x=r\sqrt{\frac{\pi}{t}}$$

Figure 4:
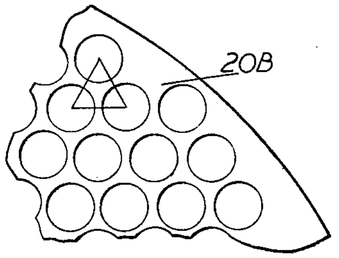

The maximum transmission which can be obtained from such a plate is $\pi/4$, i.e. 0.7854. The aperture plate shown in FIGURE 4 in which the centres of the circular apertures form a pattern of equilateral triangles, gives a maximum transmission value of $\pi/2\sqrt{3}$, that is to say 0.907. A suitable radius for the apertures is 0.5 mm.

Figure 5:
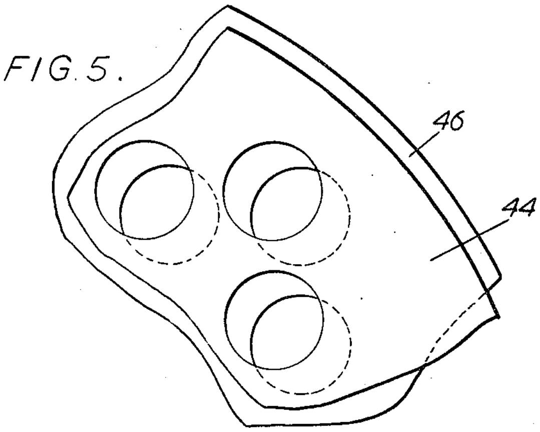
FIGURE 5 illustrates a method of varying the aperture of an optical projection system.

The optical aperture of a projection system can be varied in a number of ways, but one convenient way of permitting variation over a continuous range is shown in FIGURE 5. This variation can be carried out during the operation of the receiver if desired. FIGURE 5 shows an aperture plate consisting of two layers 44 and 46, each having a plurality of apertures, placed one behind the other, one being fixed while the other is arranged to be rotated about a central axis perpendicular to the plane of the plate. It will be clear that as the rotatable plate is moved the extent to which the apertures in the two plates overlap one another is varied, thereby varying the effective optical aperture of the two plates. Other forms of relative movement between the plates can be used if desired.

Figure 7:
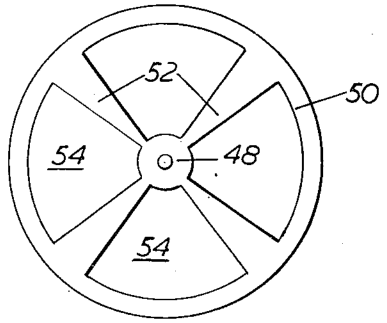
FIGURE 7 shows a further alternative form of aperture plate.

If it is necessary to obtain a transmission value which is close to 1.0, an aperture plate of the kind shown in FIGURE 7 can be used with advantage. In this case the plate consists of a central portion 48 joined to a rim 50 by radial members 52 so as to leave apertures 54. Again two such plates can be placed one behind the other and arranged for relative rotation in order to provide means for smooth adjustment of the optical aperture of the system.

Figure 6:
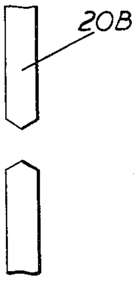
FIGURE 6 illustrates the manner in which an aperture is formed in an aperture plate.

FIGURE 6 shows the manner in which the apertures should be formed in the aperture plate if its thickness is more than about 0.2 mm. It will be seen that each side of the aperture edge is provided with a bevel, the angle of which may be about 30°. Such bevelling may not be necessary, however, for very thin plates, which are desirable so that rays travelling obliquely will not be obstructed much more than rays which are incident normally at the plane of the plate.

Whilst it is an important advantage of my invention that it enables equal drives to be applied to the modulator electrodes of the respective cathode ray tubes in a colour television receiver and, as far as possible, enables identical cathode ray tubes to be used at substantially equal black-out voltages, fine adjustment of the intensity of the three individual colour images to obtain a good white can be obtained by small adjustments of the power supplied to the individual phosphors by, for example, adjusting the drive to the modulator electrodes or the black-out potentials of the individual cathode ray tubes. It is found that this can be done without noticeable deterioration of a colour or compatible monochrome picture provided that these adjustments cover only a small range, for example those necessary to compensate for differences between the tubes if these are small. Some adjustment may also be effected by applying different potentials to the phosphors of different colours.

Although the invention has been described with reference to a colour television receiver employing three cathode ray tubes each with its individual projection system, it will be clear that the invention can also be applied to television receivers, including radar receivers, having other forms of electron discharge tube and having less than or more than three tubes. Thus, in an industrial colour television receiver only two cathode ray tubes might be employed while in a domestic colour television receiver two red tubes might be employed, making a total of four tubes, in order to improve the red efficiency. The invention can also be applied to a monochrome receiver employing only a single cathode ray tube, in which case it forms a convenient method of monochrome light control.

I claim:

1. A television receiver including an electron discharge tube having a fluorescent screen and means for controlling an electron beam to form a raster thereon, a viewing screen, an an optical projection system co-operating with said fluorescent screen to form an image of the raster on said viewing screen, said optical projection system including an aperture plate having a large number of apertures formed therein, said apertures being distributed over the area of said plate covered by said projected optical image to produce substantially uniform illumination of said viewing screen.

2. A colour television receiver including at least two electron discharge tubes each having a fluorescent screen and means for controlling an electron beam to form a raster thereon, said fluorescent screens fluorescing in different colours when struck by said electron beams, the receiver further including a common viewing screen, and an optical projection system for each tube so arranged that images of said rasters on said fluorescent screens are superimposed on said common viewing screen to produce thereon a composite colour or monochrome picture, at least one of said optical projection systems including an aperture plate having a large number of apertures formed therein, said apertures being distributed over the area of said plate covered by said projected optical image to produce substantially uniform illumination of said viewing screen, the total area of the apertures in said plate being selected in accordance with the desired value of the numerical aperture of the corresponding projection system to produce a pre-determined colour balance.

3. A colour television receiver according to claim 2, including three electron discharge tubes having fluorescent screens which fluoresce in red, green and blue respectively when struck by electron beams.

4. A colour television receiver according to claim 2, in which said apertures in said aperture plates are of the same size and shape, the number of apertures in each plate varying in accordance with the required aperture numerical.

5. A television receiver according to claim 2, in which the apertures in said aperture plate are circular and in which the centres of said apertures form a pattern of squares.

6. A television receiver according to claim 2, in which the apertures in said aperture plate are circular and in which their centres form a pattern of equilateral triangles.

7. A television receiver according to claim 2, in which said aperture plate has a central area joined to a rim by a plurality of radial members, the rim, the central area and the radial members defining between them said apertures for the passage of light.

8. A television receiver according to claim 2, in which the edge of an aperture in said aperture plate is formed with a bevel on each side.

9. A colour television receiver including at least two electron discharge tubes each having a fluorescent screen and means for controlling an electron beam to form a raster thereon, said fluorescent screens fluorescing in different colours when struck by said electron beams, the receiver further including a common viewing screen, and an optical projection system for each tube so arranged that images of said rasters on said fluorescent screens are superimposed on said common viewing screen to produce thereon a composite colour or monochrome picture, at least one of said optical projection systems including an aperture plate having a large number of apertures formed therein, said apertures being distributed over the area of said plate covered by said projected optical image to produce substantially uniform illumination of said viewing screen and means for adjusting the total aperture area of said aperture plate to vary the numerical aperture of the corresponding optical projection system to vary the colour balance on said viewing screen.

10. A colour television receiver including at least two electron discharge tubes each having a convex fluorescent screen and means for controlling an electron beam to form a raster thereon, said fluorescent screens fluorescing in different colours when struck by said electron beams, the receiver further including a common viewing screen, and for each tube a mirror optical projection system having a meniscus corrector lens and comprising a concave mirror formed to define a central hole through which said electron beam passes to reach said convex fluorescent screen, the light from which is reflected by said concave mirror through a meniscus lens to said common viewing screen, said optical projection systems being so arranged that images of said rasters on said fluorescent screens are superimposed on said common viewing screen to produce thereon a composite colour or monochrome picture, at least one of said optical projection systems including an aperture plate, located between said concave mirror and said meniscus lens and having a large number of apertures formed therein, said apertures being distributed over the area of said plate covered by said projected optical image to produce substantially uniform illumination of said viewing screen, the total area of the apertures in said plate being selected in accordance with the desired value of the numerical aperture of the corresponding projection system to produce a pre-determined colour balance.

11. A colour television receiver including three electron discharge tubes each having a fluorescent screen and means for controlling an electron beam to form a raster thereon, said fluorescent screens fluorescing in red, green and blue respectively when struck by said electron beams, said receiver further including a common viewing screen and three optical projection systems co-operating with said three tubes so that images of said rasters on said fluorescent screens are superimposed on said common viewing screen to produce thereon a composite colour or monochrome picture, at least two of said optical projection systems including an aperture plate having a large number of apertures formed therein, said apertures being distributed over the area of said plate covered by said projected optical image to produce substantially uniform illumination of said viewing screen, the total area of the apertures in each plate being selected in accordance with the desired value of the numerical aperture of the corresponding projection system, the operating conditions of the tubes and the numerical apertures of said optical projection systems being chosen so that incoming transmitter signals representing white result in the production on said common viewing screen of a colour which is substantially white.

12. A colour television receiver according to claim 11, in which when the drive potentials applied to the control or modulator electrodes of the discharge tubes are substantially equal the resulting colour on the common viewing screen is substantially white.

13. A colour television receiver according to claim 11, in which the black-out potentials applied to the electrodes of the electron discharge tubes are substantially equal.

14. A colour television receiver including at least four electron discharge tubes each having a fluorescent screen and means for controlling an electron beam to form a raster thereon, said fluorescent screens fluorescing in different ones of the colours red, green and blue when struck by electron beams, the receiver further including a common viewing screen and an optical projection system co-operating with each tube whereby images of the red, green and blue rasters on said fluorescent screens are superimposed on said common viewing screen to produce thereon a composite colour or monochrome picture, each optical projection system associated with at least one of the colours including an aperture plate having a large number of apertures formed therein, said apertures being distributed over the area of said plate covered by said projected optical image to produce substantially uniform illumination of said viewing screen, the total area of the apertures in each plate being selected in accordance with the desired value of the numerical aperture of the corresponding projection system, the number of tubes for each colour, the numerical apertures of said optical projection systems and the operating conditions of said tubes being so chosen that incoming signals representing white result in the production of a colour which is substantially white on said common viewing screen.

15. A colour television receiver according to claim 14 including two tubes having fluorescent screens which fluoresce in red when struck by an electron beam, one tube having a screen which fluoresces in green and one tube having a screen which fluoresces in blue.

References Cited in the file of this patent

UNITED STATES PATENTS

| | | |
|---|---|---|
| 1,982,187 | Wright | Nov. 27, 1934 |
| 2,352,914 | Rackett | July 4, 1944 |
| 2,429,849 | Somers | Oct. 28, 1947 |
| 2,454,144 | Epstein | Nov. 16, 1948 |
| 2,742,522 | Law | Apr. 17, 1956 |
| 2,757,232 | Goodale | July 31, 1956 |